United States Patent [19]

Thurber

[11] Patent Number: 4,620,350
[45] Date of Patent: Nov. 4, 1986

[54] APPARATUS FOR INTERFERENCE-FITTING MALE AND FEMALE MEMBERS

[75] Inventor: Scott W. Thurber, Allentown, Pa.

[73] Assignee: Air Products and Chemicals, Inc., Allentown, Pa.

[21] Appl. No.: 772,969

[22] Filed: Sep. 5, 1985

Related U.S. Application Data

[62] Division of Ser. No. 396,187, Jul. 8, 1982, Pat. No. 4,555,839.

[51] Int. Cl.[4] .............................................. B23P 19/02
[52] U.S. Cl. ........................................ 29/235; 29/800; 62/298
[58] Field of Search ................. 29/800, 235, 446, 447, 29/450, 451; 62/298, 1; 285/381

[56] References Cited

U.S. PATENT DOCUMENTS

| | | | |
|---|---|---|---|
| 1,955,728 | 4/1934 | Allen et al. | 62/1 |
| 1,980,156 | 11/1934 | Emrick | 62/1 |
| 2,038,592 | 4/1936 | Morris | 62/1 |
| 2,506,069 | 5/1950 | Dalton | 29/450 UX |
| 2,572,215 | 10/1951 | Swart | 29/450 X |
| 2,843,067 | 7/1958 | Dugan | 62/1 X |
| 3,000,089 | 9/1961 | Baker et al. | 29/451 X |
| 3,621,550 | 11/1971 | Colestock | 29/156.7 A |
| 3,724,059 | 4/1973 | Celovsky | 29/426.6 X |
| 4,273,161 | 6/1981 | McLaughlin | 29/235 X |
| 4,305,203 | 12/1981 | Bock et al. | 29/800 |
| 4,314,396 | 2/1982 | Nunlist et al. | 29/156.8 R |

FOREIGN PATENT DOCUMENTS

| | | | |
|---|---|---|---|
| 1150801 | 6/1963 | Fed. Rep. of Germany | 29/450 |
| 573314 | 9/1977 | U.S.S.R. | 29/800 |

*Primary Examiner*—Charlie T. Moon
*Attorney, Agent, or Firm*—Carol A. Nemetz; James C. Simmons; E. Eugene Innis

[57] ABSTRACT

A method of interference-fitting either a male or female resilient member to its corresponding female or male member using a hollow mandrel cooled to preferably cryogenic temperatures which freezes a compressed resilient member to at least its glass-transition temperature. The method enables one to combine the two members before the resilient member warms to a temperature above its glass-transition temperature. The method and apparatus have found usefulness in the assembly of elastomeric high voltage electrical insulators.

21 Claims, 8 Drawing Figures

APPARATUS FOR INTERFERENCE-FITTING MALE AND FEMALE MEMBERS

This is a division of application Ser. No. 396,187, filed July 8, 1982, now U.S. Pat. No. 4,555,839.

TECHNICAL FIELD OF THE INVENTION

The present invention relates to a method of joining a resilient male or female part to its corresponding female or male part using a force fitting step and an apparatus found useful in assisting in this method and is more particularly concerned with joining a part composed of plastic, elastomeric or other polymeric materials which enter a glass-transition region at certain low temperatures, which characteristic is critical to the method.

BACKGROUND OF THE PRIOR ART

Force fitting is to be distinguished from shrink fitting which is used in connection with an interference-fitting method for joining entirely different materials having entirely different characteristics. In the latter method a non-resilient part, i.e. a metal, of a two-part assembly is cooled to a low temperature to cause it to shrink, the shrunken male part is then mounted, for example, into a female second part and allowed to expand at room temperature to create the "shrink fit"; see U.S. Pat. Nos. 1,955,728, 1,980,156, 2,038,592, 3,621,550, 4,305,203 and 4,314,396. Shrink fitting is also utilized in the method and apparatus disclosed and claimed in U.S. Pat No. 3,724,059. The method described in the latter patent separates interference-fitted members by utilizing the contraction properties of metals by subjecting the interior part of the two-part assembly to liquid nitrogen or other suitable refrigerant which shrinks this part while the outer member is expanded by heating. This enables one to easily separate the two parts.

A similar method to shrink fitting is one which utilizes the martensitic transformation characteristics of certain alloys. In this method, pipe couplings of such an alloy are expanded by passing a mandrel through them while they are immersed in a liquid nitrogen (LIN) bath and cooled to a temperature at which a martensitic transformation takes place. When the couplings are warmed to room temperature they return to the austenitic phase, causing them to spring-back to their original shape. This method is used in joining ends of pipes.

In contrast to prior art methods which use either martensitic transformation or thermal expansion/contraction (shrink) fitting, the present invention is an improvement over prior art methods which use a force fitting step in a method for joining, for example, elastomeric materials having orifices therethrough with a second member. Examples of products which have been made by such prior art processes include electrical insulators in which the female member is physically expanded over a solid Teflon ® fluorocarbon mandrel and totally immersed in a dry ice/methanol bath for a five to ten minute period in order to completely cool the elastomeric workpiece to its glass transition temperature, i.e., that region in which the elastomer, either raw or cured, passes from its rubbery, elastic state to a glassy region below which the material no longer displays its elastomeric properties. Such a transition can be determined from the materials thermomechanical curve by determining the temperature dependence of deformation caused by the action of a constant stress under a given temperature-time condition and then plotting the deformation or strain versus the temperature. After the entire female part has reached its glass-transition temperature, it is immediately removed from the bath and mounted onto the male part which can be a metal in the case of friction-fit combinations or an elastomeric core in the case of true interference-fit combinations, e.g. electrical insulators. The prior art method is also useful for mounting gaskets on various rods and the like and in the manufacture of electrical conducting parts which must be insulated or similarly coated with a suitable elastomeric material.

The prior art methods suffer from many inherent inefficiencies including the fact that the entire female member must be cooled to its glass-transition temperature before it can be inserted over the male member; the dry ice/alcohol bath cannot be further used; the carbon dioxide and/or alcohol vapors, if they are allowed to accumulate in the work environment, will create a safety hazard; and the equipment used for such a method tends to be cumbersome.

SUMMARY OF THE INVENTION

In contrast to the prior art methods, it has been found that a highly efficient, compact, noncomplicated apparatus can be used in the joining operation which has found to be very economical because only a portion of the member to be joined is brought to its glass-transition temperature and the cooling media can be easily channeled and used in another area of the manufacturing plant. This latter advantage also avoids the environmental and safety hazards.

In accordance with the present invention a method of interference-fitting including friction-fitting a resilient first workpiece to a second workpiece is provided which comprises the sequential steps of: (1) forcing at least a portion of the resilient workpiece into contact with a hollow mandrel to compress that portion, (2) passing within the hollow mandrel a refrigerant at a temperature at least as cold as the glass transition temperature of the resilient workpiece, (3) removing the resilient workpiece from the mandrel after at least a period of time required for the portion in contact with the mandrel to cool to at least its glass-transition temperature, (4) combining the resilient and second workpieces so that at least the portion is in contact with the second workpiece, and (5) raising the temperature of the portion to above its glass transition temperature.

In the first step of the method the walls of the resilient workpiece are forced and physically distorted in a direction substantially perpendicular to the surface of the mandrel with which it is in contact.

In the second step of the method, the refrigerant that is passed or circulated is LIN, liquid carbon dioxide or other similar cooling media to assure that the glass-transition temperature (Tg) is maintained within the mandrel and preferably to assure the temperatures lower than Tg are maintained to allow for satisfactory heat transfer through the walls of the hollow mandrel.

In the third step, the period of time for the portion of the first workpiece in contact with the mandrel to reach Tg is from 15 seconds to 2 minutes which is considerably shorter than that required in the prior art methods.

In the fourth step, the first workpiece is immediately mounted onto, over or into the second workpiece in a manner consistent with the particular configuration desired in the at least two-piece combination.

In the final step, the portion of the first workpiece at Tg is warmed to above Tg causing it to expand and return to substantially its original configuration to produce the interference-fitted combination.

This method does not utilize a metallic member's thermal contraction/expansion properties, but utilizies the glass-transition properties of a resilient member. In a sense the physically distorted shape of the first member is "frozen" for only that period of time that is required to remove it from the hollow mandrel and to insert it onto or into the second member. It is apparent that these removal and mounting steps can be done by equipment well known in the art. For example, a pneumatic cylinder can be used for pushing the first member from the mandrel after a portion of it has reached its Tg region. The length of time the first member remains in a suitable "frozen" condition to allow the first part to be combined with the second workpiece is approximately two minutes. It has been found that if greater cool-down periods are utilized, the part will hold its distorted shape for a longer period. It is apparent that one skilled in the art can optimize the amount of time necessary to have the first piece remain in contact with the hollow mandrel through which the cooling media is circulated to allow sufficient time to remove and assemble the combination. For any given cool-down period, the method of the present invention has been found to be much more efficient than that of the prior art.

The apparatus used in this interference-fitting method comprises in addition to the hollow mandrel which is closed at one end for receiving at least a portion of the resilient workpiece in its compressed state, a tube means positioned within the mandrel for supplying adjacent to the closed end the refrigerant used to cool a portion of the first workpiece and means for recovering the resulting warmed refrigerant which is connected to the other end of the mandrel. The recovered refrigerant can be used for inerting, additional cooling capacity in another portion of the plant, recycled to provide precooling of the mandrel and/or to eliminate frosting of the mandrel, as a source of instrument air or safely vented to avoid being introduced into the work environment in amounts which could be hazardous to the health and safety of the plant operators.

DETAILED DESCRIPTION OF THE INVENTION

Figure 1:
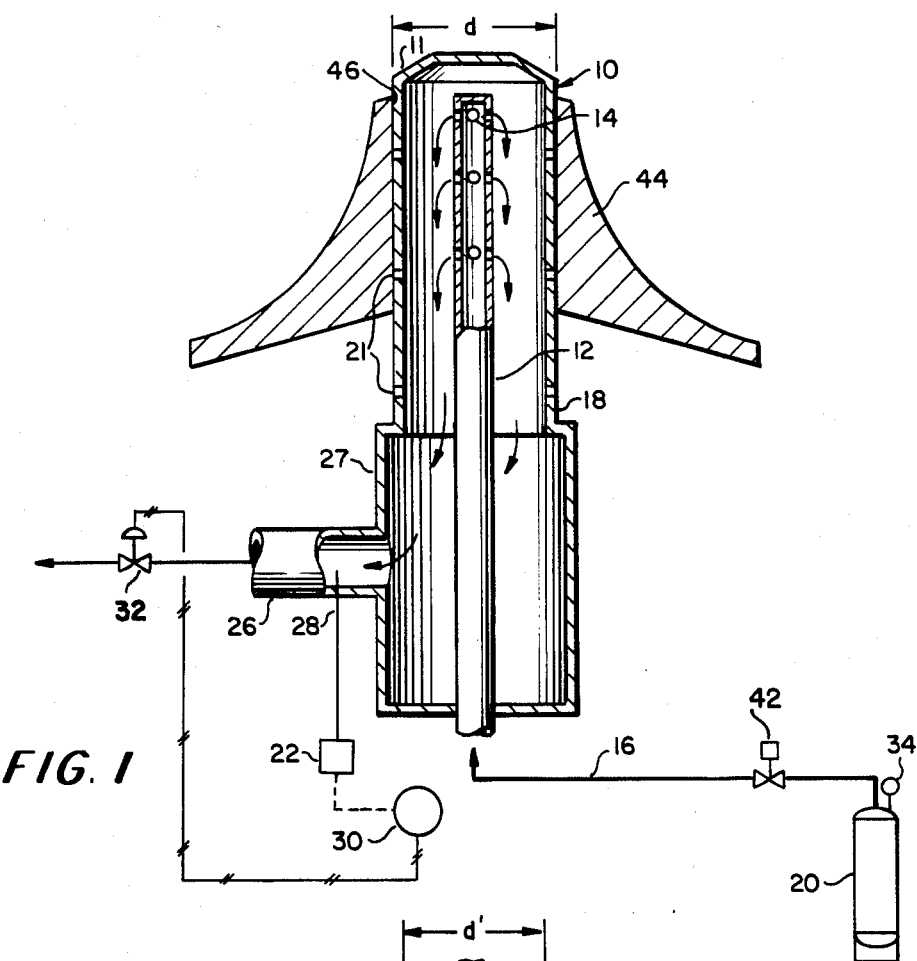
FIG. 1 is a partially sectioned and partially schematic view of one embodiment of the apparatus of this invention, which shows an orifice-containing member mounted onto the hollow mandrel during its cool-down period.
Figure 2:
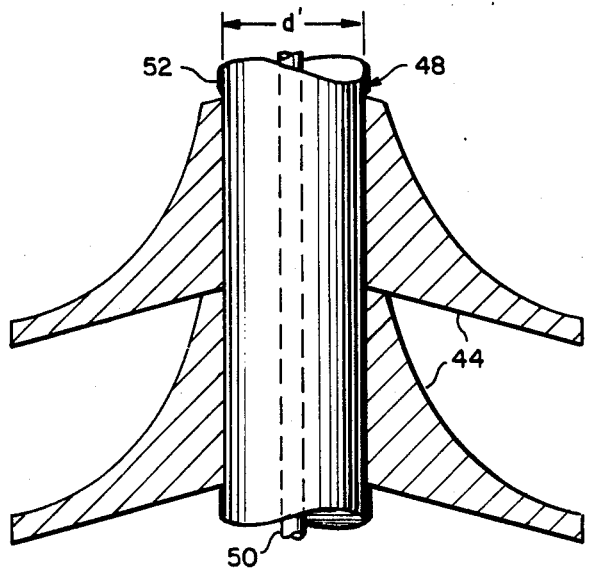
FIG. 2 shows a partially sectioned view of a portion of a high voltage electrical insulator after it has been assembled and the temperature of the orifice-containing member is higher than its glass transition temperature.

Referring to FIGS. 1 and 2, hollow mandrel 10 having a circular cross-section with an outside diameter "d" and a closed tapered end 11 contains tube 12 positioned concentrically within the hollow interior of mandrel 10. A plurality of holes 14 are drilled or otherwise positioned radially about the upper portion of mandrel 10 to supply a refrigerant through line 16 from storage tank or cylinder 20 in such a manner that the inside surface of upper section 18 of mandrel 10 is bathed with the refrigerant. A plurality of vent holes 21 may be drilled along upper section 18 to shroud the exterior surface with dry, vaporized refrigerant to prevent frosting up of mandrel 10. The flow of refrigerant through line 16 is controlled by means of a suitable temperature controller 22 which senses the temperature in refrigerant exit 26 in lower section 27 of mandrel 10 by means of thermocouple 28 and sends a signal to I/P converter 30. Converter 30 converts the electrical signal to control the flow of LIN through pneumatic valve 32 in exit line 26. Cylinder 20 is equipped with typical safety gauge and control valve assembly, shown collectively as gauge 34 and valve 42. The warmed refrigerant passing through exit 26 and valve 42 can be utilized in subsequent cooling operations which are not as critical as those of the present method. It can also be recycled and a portion mixed with cold refrigerant or it can simply be vented. Insulator member 44 comprising ethylene-propylene diene elastomer (EPDM synthetic rubber) is shown forceably mounted on mandrel 10 so that the surface of orifice 46 in member 44 is compressed in an outwardly perpendicular direction from the surface of upper section 18 of mandrel 10 and the original diameter, "d'" of orifice 46 is increased to diameter "d".

The ratio of d'/d is in the range of about 1:1.01 to 1:1.75, preferably 1:1.02 to 1:1.5 and still more preferably 1:1.05 to 1:1.25 so that the circumference of the upper cylindrical section 18 is about 1% to 75%, 2% to 50% and 5% to 25%, respectively, greater than the circumference of the resilient female member at room temperature. Similarly in the case of tapered, conically-shaped or irregular shaped female resilient members, the circumference of the smallest cross-sectional section of the mandrel occupied by the member should be similarly greater than that of the member under its original ambient condition. It is apparent for male resilient members the opposite is true. Thus in hollow mandrel 60 of FIG. 3, the diameter d" of the minimum cross-sectional circumference of recess 62 is 1% to 75%, preferably 2 to 50% and still more preferably 5 to 25% less than a similar cross-section of original, uncompressed plug 72. In the case of a purely conical male member, the mimimum cross-sectional circumference is the first measurable circumference taken from the apex.

After at least the surface of orifice reaches the glass-transition temperature of approximately minus 50° C. for the EPDM material, member 44 is removed and mounted on two-piece member 48 which comprises central fiber glass core 50 and EPDM sleeve 52. After the surface of orifice 46 is warmed above its glass transition temperature, member 44 forms an interference fit with member 48. It is apparent that to assure a sufficient interference fit, the outside diameter of sleeve 52 must be greater than d' of orifice 44. The sequential steps of the method are repeated until a plurality of insulators members 44 are positioned to make up the desired high voltage electrical insulator 48, only a portion of which is illustrated in FIG. 2.

While EPDM was the only material used in connection with the presently claimed apparatus and method, any resilient material can be used in connection with this invention including glass, plastics, polymers, raw and cured elastomers and other polymeric-containing materials which all are characterized by passing through a glass-transition region.

To facilitate the removal of the orifice-containing member after cooling, the exterior surface of upper section 18 of mandrel 10 can be coated with a suitable lubricant such as a fluorine-containing polymer or silicones. For example, polychlorotrifluoroethylene and polytetrafluoroethylene polymers and the like have been found to retain their lubricity at a cryogenic temperatures. Similarly, silicones experience exceptionally small changes in viscosity with temperature and would retain sufficient lubricity at liquid nitrogen temperatures, e.g. $-195°$ C. ($-320°$ F.) to enable them to serve as lubricants for use in this manner.

Figure 3:
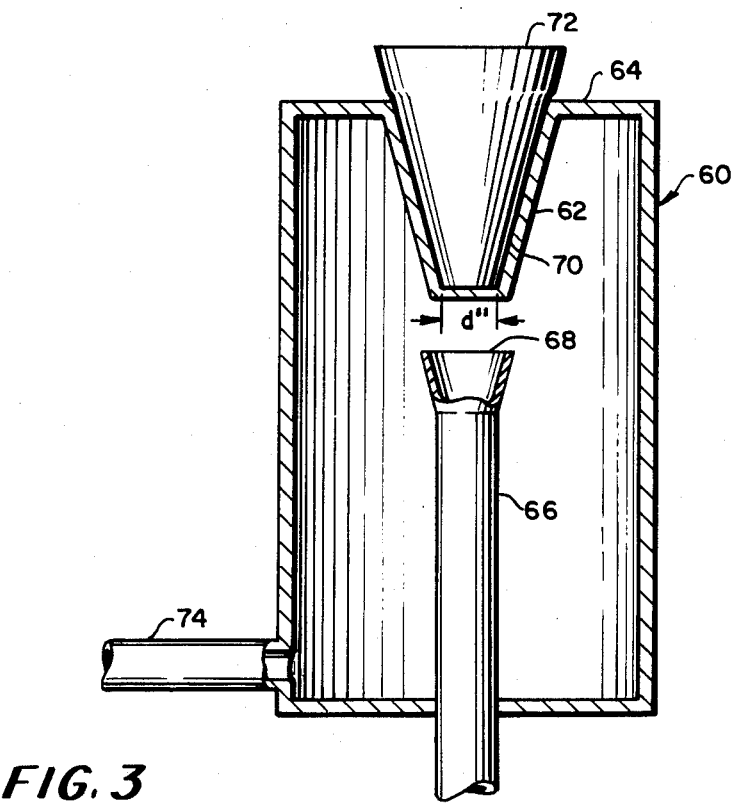
FIG. 3 is a partially sectioned view of another embodiment of the apparatus of this invention which shows a major portion of a permanent plug of an elastomer mounted into a cavity of a hollow mandrel during the cool-down period.

In FIG. 3, hollow mandrel 60 having a conically-shaped recess 62 in closed end 64 contains tube 66 having flared, open end 68 positioned to supply refrigerant from the same type of means shown in FIG. 1. Exterior surface 70 of recess 62 is maintained at the desired temperature below the glass-transition region of the resilient material of plug 72. Plug 72, composed of, for example, an ethylene-propylene copolymer, is shown forced into recess 62 so that its tapered end is physically compressed and occupies a smaller volume than that of the plug in its uncompressed state. Upon removal from mandrel 60, one can easily insert plug 72 into a corresponding female member for permanently sealing it once the surface of plug 72 that had been in contact with surface 70 of recess 62 is increased in temperature above its glass-transition temperature. The warmed refrigerant is passed through exit 74 and is utilized in the manner set forth above in connection with the description of FIG. 1.

Figure 4:
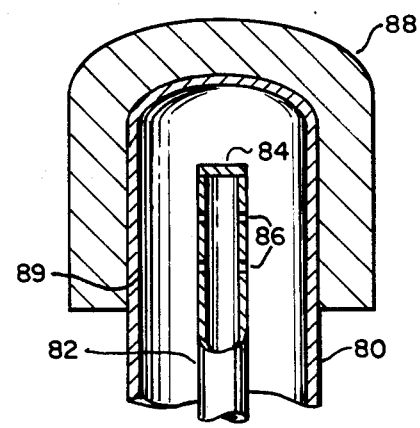
FIG. 4 is a partially sectioned view of still another embodiment of the apparatus of this invention which shows an elastomeric cap mounted over the end of a hollow mandrel during the cool-down period.

In FIG. 4, a portion of hollow mandrel 80 is shown containing tube 82 having closed end 84 and a plurality of holes 86 positioned in the upper portion of mandrel 80 through which refrigerant is supplied as in the apparatus of FIG. 1. Cup-shaped member 88 is shown forceably mounted over the end of mandrel 80 to "freeze" the interior surface of mouth 89 of member 88 in its widened position for use as described above in connection with FIG. 1.

Figure 5:
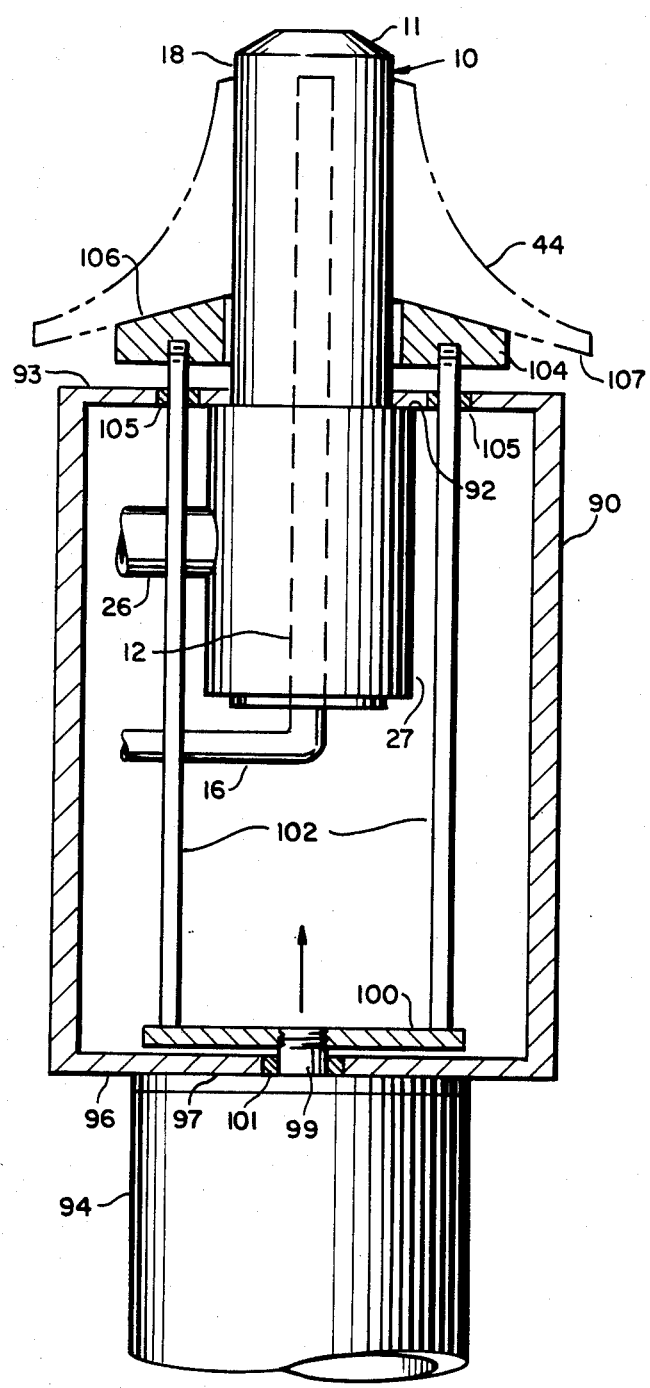
FIG. 5 is a partially sectioned view of a hollow mandrel similar to that shown in FIG. 1 combined with a support frame and a pneumatic cylinder used in removing the orifice-containing member, shown in phantom, after the cool-down step.
Figure 8:
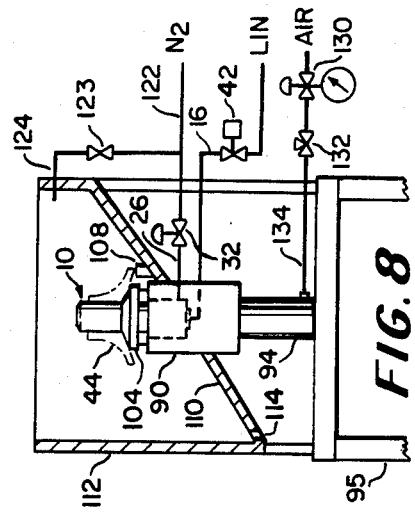
FIG. 8 is a partially sectioned and partially schematic side view of the apparatus of this invention showing a phantom view of the elastomeric member engaging a timer switch.
Figure 6:
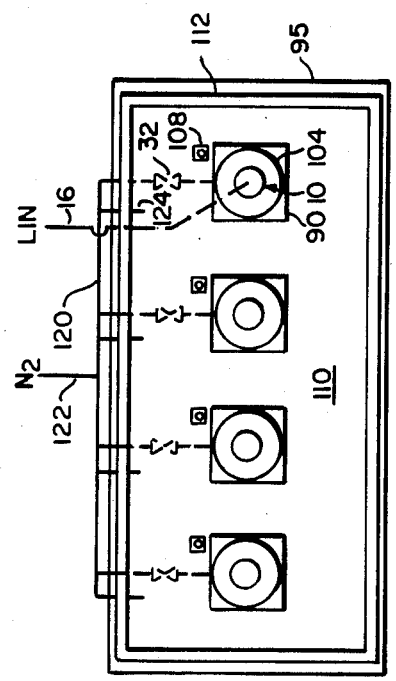
FIG. 6 is a partially sectioned and partially schematic top view of a set of four apparatus of this invention with one of the set containing numbering of the essential elements.
Figure 7:
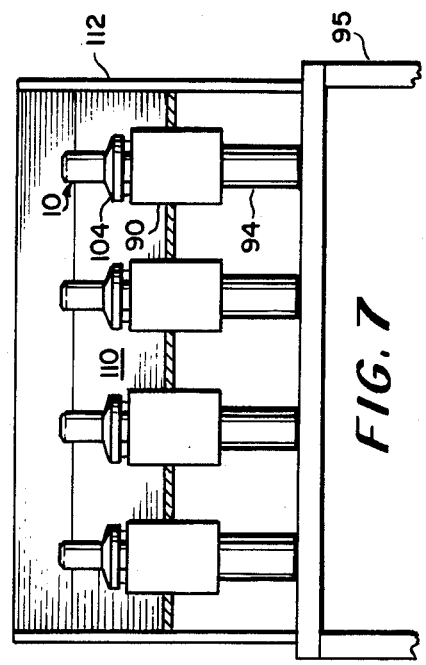
FIG. 7 is a partially sectioned and partially schematic front view of the set of apparatus of this invention with the front panel and a portion of the floor of the enclosure for the mandrels removed and without the piping details shown in FIGS. 6 and 8.

In FIGS. 5-8, hollow mandrel 10 is shown in combination with support frame 90 which is welded about its shoulder 92 or otherwise physically attached to top 93 of frame 90. Pneumatic cylinder 94, a suitable cylinder for this invention is manufactured and sold by Miller Fluid Power Company, is attached to a suitable table or stand 95 as shown in FIGS. 7-8. Bottom 96 of frame 90 is welded or otherwise physically attached to top 97 of cylinder 94. Pneumatically operated piston 99 is positioned through an opening in frame bottom 90 and is attached to bottom plate 100 with gasket 101 occupying the annulus of the opening as shown in FIG. 5. Tie rods 102 are connected between bottom plate 100 and insulator remover collar 104 and pass through resilient grommets 105. Collar 104 is slidably journaled around upper section 108 of mandrel 10 and has sloping upper surface 106 which is designed to be of the same angle with respect to the horizontal plane as sloping bottom 107 of insulator member 44 as shown. Bottom 107 is forced, either manually or electromechanically, into contact with sloping sides 106. Bottom 107 trips time limit switch 108 (shown in FIGS. 6 and 8) which transmits a signal to a timer (not shown). After a given interval of approximately 30 seconds, pneumatic cylinder 94 is activated by means of the timer causing piston 99 to rise, which in turn causes collar 104 to urge insulator member 44 completely off closed end 11 of mandrel 10. Insulator member 44 falls onto inclined floor 110 of enclosure 112 (shown in FIGS. 6, 7 and 8). Inclined floor 110 is provided with sufficiently slope relative to the floor upon which tables 95 rests to cause member 44 to slide to lowest level of floor 110. It is at least contemplated that floor 110, and preferably the entire enclosure 112, would be composed of sheet metal to provide a relatively frictionless surface over which member 44 would slide to its lowest position allowing ready access to an operator for the combining step of the method of this invention. Weep holes 114 are provided in the lowest level of floor 110 as shown in FIG. 8 to prevent a build-up of condensate within enclosure 112. The warmed refrigerant passes through line 26 and valve 32 into manifold 120 which collects all of the exit gas from the mandrels in service and channels the nitrogen via line 122 to other plant service such as in cooling systems and for use in inert gas blanketing. A portion of the warmed refrigerant is recycled through valve 123 and line 124 to enclosure 112 to provide a dry gas shroud to avoid frosting of the exterior of the mandrel and to lessen the overall heat requirements of the system. Enclosure 112 has an open ceiling and is positioned at a convenient height from the floor of the plant to facilitate manually forcing members 44 over mandrels 10. A suitable doorway (not shown) could be utilized to close off the top of enclosure 112. Because cold nitrogen gas is heavier than the ambient air, the hazard in subjecting the operators to high nitrogen concentrations is avoided by providing enclosure 112 with the four side panels. Suitable alarms and shut-off valves (not shown) well-known in the art can be utilized to prevent any possibility of such a hazard, especially in poor ventilation work areas. Pneumatic cylinder 94 is supplied with, for example, 60 psig air through regulator 130, which is pneumatically operated by the timer, valve 132 and line 134.

EXAMPLE

A hollow mandrel generally of the type shown in FIG. 1 consisted in a 1¼ inch schedule 40 brass pipe having an o.d. of 1.66 inches and a smooth finished exterior as upper section 18, a flat ¼ inch plate attached to the upper end of the pipe as end 11 and a 1¼ inch schedule 40 brass tee threadably engaged to the lower end of the pipe as lower section 27, and having a ¼ inch o.d. stainless steel tube with a 0.035 inch wall thickness as tube 12 positioned along its longitudinal axis, within 1 inch from the inside surface of the end plate and operably mounted to the lower end of the tee by means of a 1¼ inch by ¼ inch brass bushing, a ¼ inch nipple and a Swagelock fitting drilled to receive the ¼ inch o.d. tube. The tube was connected to a cylinder of LIN by means of an ¼ inch elbow and an insulated ¼ inch copper tubing. A ⅜ inch o.d. copper tubing was connected to the tee by means of a 1¼ inch by ½ inch brass bushing and a ½ inch × ⅜ inch Swagelock fitting to serve as exit 26. A thermocouple was operably mounted in exit 26 for temperature indication without the control features referred to above in connection with the FIG. 1 description. The flow of LIN, having a normal liquefaction or boiling point of $-195°$ C. ($-320°$ F.), was manually controlled to maintain the exit temperature of the warmed nitrogen gas at approximately $-179°$ C. ($-290°$ F.).

In the table below, the data was collected on the foregoing apparatus from 7 trials using various cool-down times. Cool-down times are the amount of time to cool the surface of orifice 46 having an original diameter of 1.55 inches of EPDM member 44 in contact with the surface of upper section 18 of mandrel 10 to a temperature substantially below its glass-transition temperature. The orifice surface temperature ranged from between about $-173°$ C. and $-140°$ C. in this example. The time for insulator member 44 to warm-up above the glass-transition temperature to its final diameter of approximately 1.6 inches is recorded in the right hand column of the table. The warm-up time is that amount of time available to collect member 44 and place it around member 48.

| Trial | Cool-down Time (Sec.) | Warm-up Time (Sec.) |
| --- | --- | --- |
| 1 | 15 | 33 |
| 2 | 15 | 29 |
| 3 | 30 | 102 |
| 4 | 23 | 78 |
| 5 | 20 | 40 |
| 6 | 20 | 78 |
| 7 | 25 | 42 |

The optimum cool-down time of 30 seconds in trial 3 was found to allow sufficient warm-up time to enable an operator to mount the insulator on its core in this example. It would be obvious to one of ordinary skill in the art to obtain a similar optimum time for removing and joining any given resilient member to another.

It is apparent that many modifications can be made to the present invention and still be within the scope of the appended claims. For instance, in the apparatus, the cross-section of the mandrel may be other than circular, the recess may be designed to accommodate any shape and baffles may be located within the mandrel to direct the flow of refrigerant in any given manner and in the method, the forcing, removing and combining steps can all be efficiently done by means of robotics.

What is claimed is:

1. An apparatus for use in fitting a resilient non-metal workpiece having a glass transition region at cold temperatures to a second workpiece by means of interference fit which comprises a hollow mandrel closed at one end thereof for compressing and holding at least a portion of said resilient workpiece in its compressed state, said closed end having an annular tapered workpiece compressing surface, tube means positioned within said mandrel for supplying adjacent to said closed end a refrigerant to cool said compressed portion in contact therewith and with said compressed portion retaining said cooled compressed shape thereof after removal therefrom, and means for recovering the resulting warmed refrigerant from said mandrel whereby upon combining said cooled compressed shape retaining portion of said first workpiece in telescopic arrangement with said second workpiece and allowing said first workpiece to return to ambient temperature and unstressed shape to attain in interference fit with said second workpiece.

2. The apparatus of claim 1 wherein said tube means has a plurality of orifices directing the refrigerant to the inner portion of said mandrel.

3. The apparatus of claim 1 wherein said tube means has a longitudinal axis concentric to that of said mandrel.

4. The apparatus of claim 3 wherein said orifices are located along the longitudinal axis of said tube means.

5. The apparatus of claim 1 wherein said mandrel is tapered.

6. The apparatus of claim 1 wherein said mandrel has a tapered end.

7. The apparatus of claim 1 wherein said mandrel has a recess capable of receiving at least a portion of said resilient workpiece in its compressed state.

8. The apparatus of claim 1 wherein means for removing said resilient workpiece after it has reached at least its glass-transition temperature is operably connected to said mandrel.

9. The apparatus of claim 8 wherein said means pneumatically urges said resilient workpiece from the closed end of said mandrel.

10. The apparatus of claim 1 wherein said mandrel has at least one vent port to release a small portion of the refrigerant to prevent frosting of the external surface of said mandrel.

11. The apparatus of claim 10 wherein at least said hollow mandrel is within an enclosure to prevent any substantial portion of refrigerant from entering the work environment.

12. The apparatus of claim 11 wherein said enclosure has an open top to facilitate access to the closed end of said mandrel.

13. The apparatus of claim 1 wherein said mandrel is positioned at a convenient height for manual operations.

14. The apparatus of claim 1 wherein said mandrel comprises an upper section having said closed end and a lower section which is connected to said means for recovering the resulting warmed refrigerant and a support frame attached to the junction between said upper and lower sections of said mandrel.

15. The apparatus of claim 14 wherein pneumatic cylinder means for removing said resilient workpiece is attached to the bottom of said support frame and is operably connected to a collar, the upper portion of which contacts a portion of said resilient workpiece during operation of said apparatus.

16. The apparatus of claim 15 wherein the bottom of said pneumatic cylinder means is positioned on a base having sufficient height to position said closed end of said mandrel at a convenient height for manual operations above a floor of the work area.

17. The apparatus of claim 16 wherein at least said mandrel is within an enclosure which is supported upon said base and the bottom of said enclosure is inclined relative to the longitudinal axis of said apparatus at a sufficient angle with respect to the floor to allow said resilient workpiece to slide to an elevation above the floor substantially equal to the height of said base.

18. The apparatus of claim 17 wherein said enclosure contains at least one opening for receiving a portion of the resulting warmed refrigerant to maintain the immediate environment around said apparatus at sufficiently dry conditions to prevent frosting of the external surface of said mandrel.

19. The apparatus of claim 17 wherein a weep hole is drilled in said bottom of said enclosure at its lowest elevation above the floor for removal of condensate.

20. The apparatus of claim 18 wherein said means for recovering the resulting warmed refrigerant is connected to a manifold to channel at least a portion of the remaining warmed refrigerant to the opening of said enclosure and any remaining portion to other refrigerant uses.

21. The apparatus of claim 11 wherein the source of refrigerant is connected to said tube means, valve means and thermocouple means are operably connected to said means for recovering the resulting warmed refrigerant and temperature controller means operably connected between said thermocouple means and said valve means for controlling the temperature of the resulting warmed refrigerant to the desired degree.

* * * * *